(12) United States Patent
Shimoda et al.

(10) Patent No.: US 7,366,383 B2
(45) Date of Patent: Apr. 29, 2008

(54) OPTICAL FIBER AND METHOD OF MANUFACTURING THE OPTICAL FIBER

(75) Inventors: Koji Shimoda, Yokohama (JP); Yuji Kubo, Yokohama (JP); Makoto Shimizu, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 340 days.

(21) Appl. No.: 10/240,197

(22) PCT Filed: Mar. 13, 2002

(86) PCT No.: PCT/JP02/02366

§ 371 (c)(1),
(2), (4) Date: Sep. 30, 2002

(87) PCT Pub. No.: WO02/074713

PCT Pub. Date: Sep. 26, 2002

(65) Prior Publication Data

US 2003/0044147 A1    Mar. 6, 2003

(51) Int. Cl.
  *G02B 6/02*   (2006.01)
  *G02B 6/24*   (2006.01)
(52) U.S. Cl. .................... 385/123; 385/127
(58) Field of Classification Search .......... 65/401–403, 65/430; 385/127, 128, 123, 146
See application file for complete search history.

(56) References Cited

U.S. PATENT DOCUMENTS

| | | | | |
|---|---|---|---|---|
| 4,608,273 A | * | 8/1986 | Brambley | 427/513 |
| 4,949,038 A | * | 8/1990 | Birch et al. | 324/244.1 |
| 5,897,680 A | * | 4/1999 | Geertman | 65/402 |
| 6,317,553 B1 | * | 11/2001 | Harper et al. | 385/128 |
| 6,687,440 B2 | * | 2/2004 | Balestra et al. | 385/123 |
| 6,876,806 B2 | * | 4/2005 | Lazarev et al. | 385/128 |

FOREIGN PATENT DOCUMENTS

| | | |
|---|---|---|
| CN | 1103956 | 6/1995 |
| EP | 0 630 865 | 12/1994 |
| EP | 630865 A1 | 12/1994 |
| EP | 0 729 919 | 9/1996 |
| EP | 729919 A2 | 9/1996 |
| EP | 0 842 909 | 5/1998 |

(Continued)

OTHER PUBLICATIONS

Machine Translation of JP 07-077643, downloaded from http://www.ipdl.ncipi.go.jp/homepg_e.ipdl.*

(Continued)

*Primary Examiner*—Rodney Bovernick
*Assistant Examiner*—Omar Rojas
(74) *Attorney, Agent, or Firm*—McDermott Will & Emery LLP

(57) ABSTRACT

An optical fiber 1 comprising a glass portion 2 having a core 2a and a cladding 2b, and one or more covering layers 3 formed around the glass portion 2, in which an arrangement form of the covering layer 3 with respect to the glass portion 2 in cross section perpendicular to a longitudinal direction thereof is changed continuously in the longitudinal direction thereof.

9 Claims, 13 Drawing Sheets

FOREIGN PATENT DOCUMENTS

| | | |
|---|---|---|
| EP | 842909 A1 | 5/1998 |
| JP | 59-054645 | 3/1984 |
| JP | 59-54645 A | 3/1984 |
| JP | 62-75405 | 4/1987 |
| JP | 62-075405 | 4/1987 |
| JP | 62-75405 A | 4/1987 |
| JP | 06-194550 | 7/1994 |
| JP | 6-194550 | 7/1994 |
| JP | 6-194550 A | 7/1994 |
| JP | 7-69665 | 3/1995 |
| JP | 7-77643 | 3/1995 |
| JP | 07-077643 | 3/1995 |
| JP | 7-77643 A | 3/1995 |
| JP | 8-295528 | 11/1996 |
| JP | 08-334660 | 12/1996 |
| JP | 8-334660 A | 12/1996 |
| JP | 10-203849 | 8/1998 |
| JP | 11-302042 | 11/1999 |
| JP | 11-302042 A | 11/1999 |

OTHER PUBLICATIONS

Grieg A. Olson and Jerry L. Metcalf. "Parametric Analysis of Elasto-Optic Birefringent Axis Alignment in Eccentrically Coated Polarization-Maintaining Optical Fiber" vol. 31, No. 9/ Mar. 20, 1992.

"Parametric analysis of elasto-optic birefringent axis alignment in eccentrically coated polarization-maintaining optical fiber", Greig A. Olson et al., Applied Optics, (US), Mar. 20, 1992, vol. 31, No. 9, 1234-1238.

Japanese Office Action issued in corresponding Japanese Patent Application No. JP 2002-573724, dated Sep. 19, 2006.

* cited by examiner

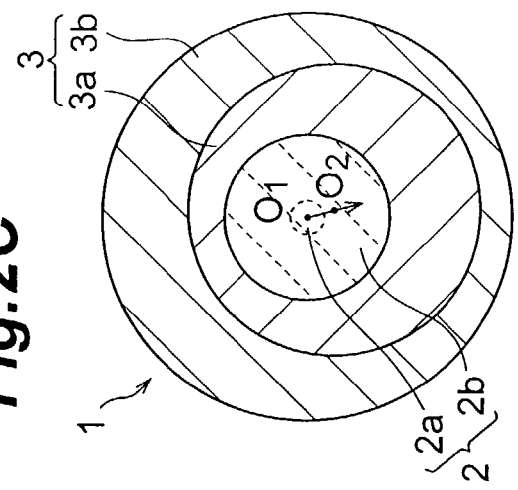
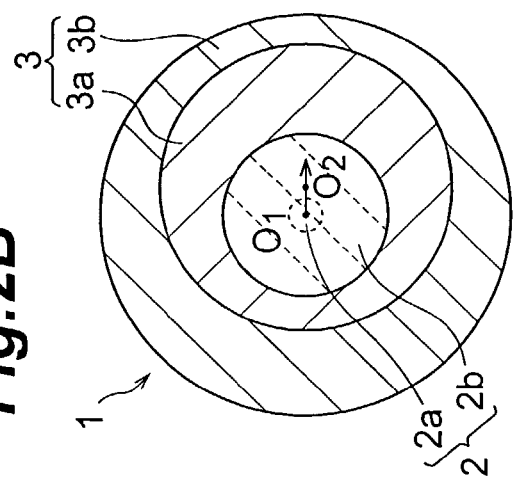
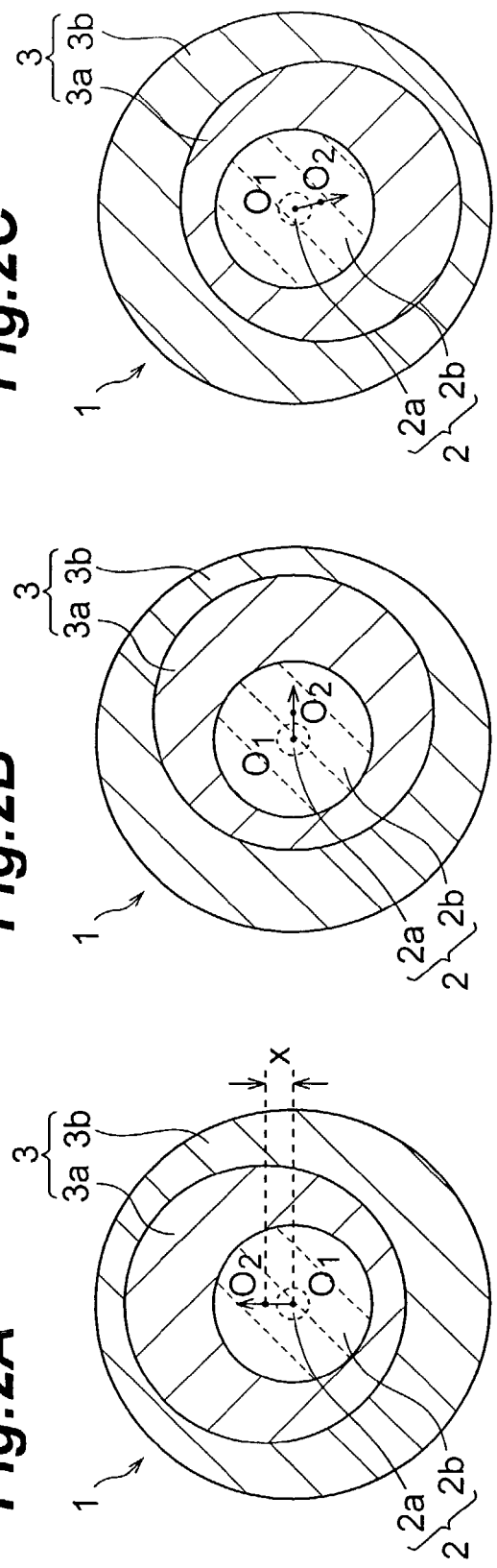
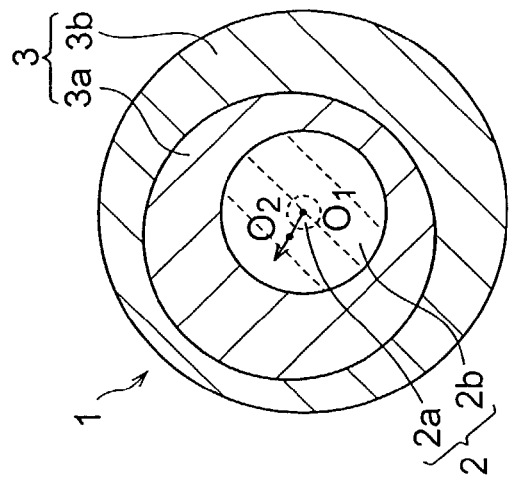
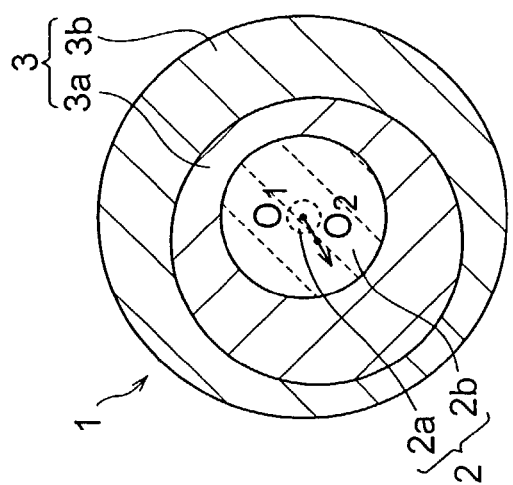

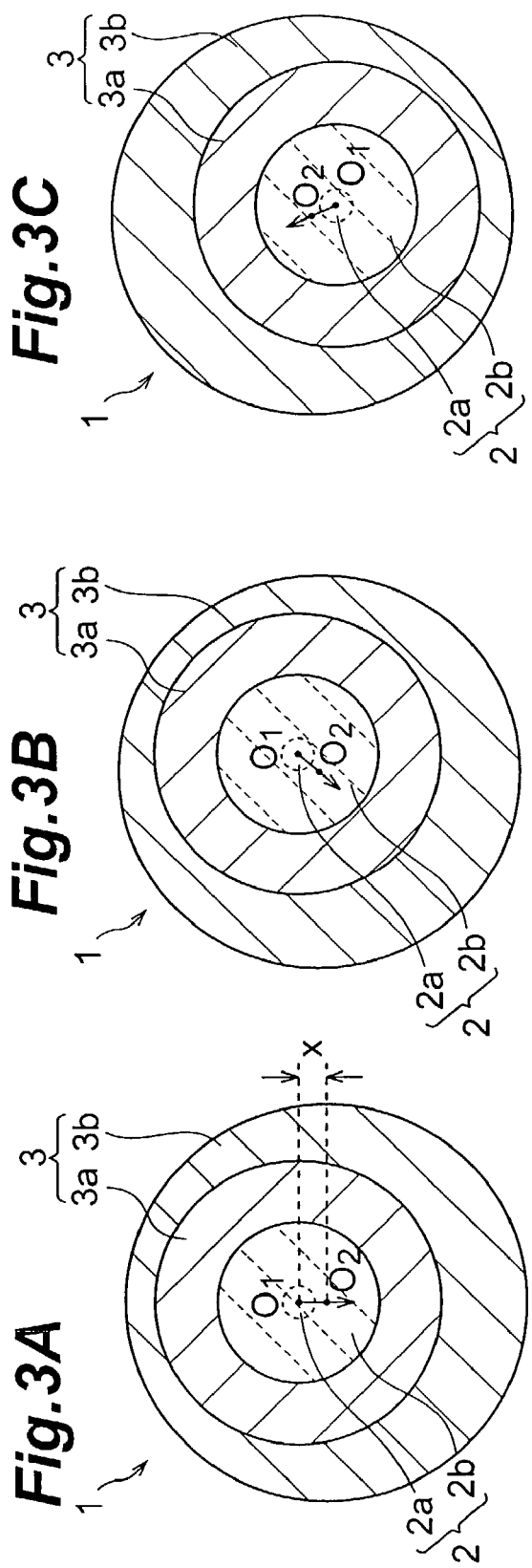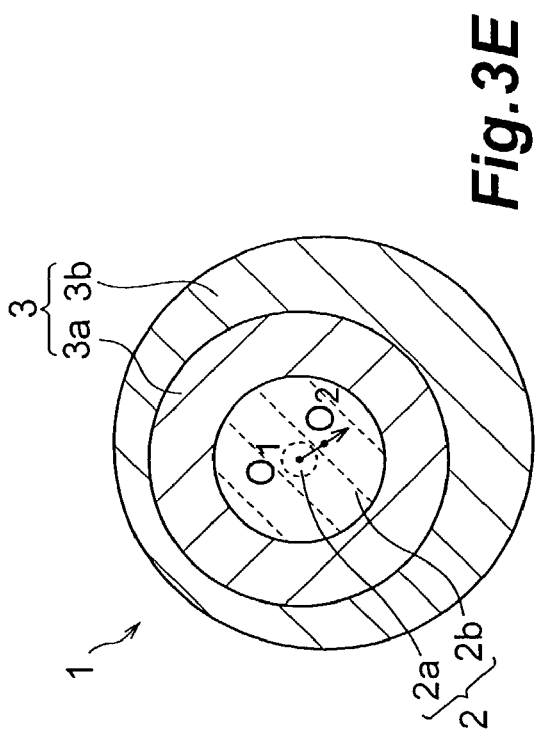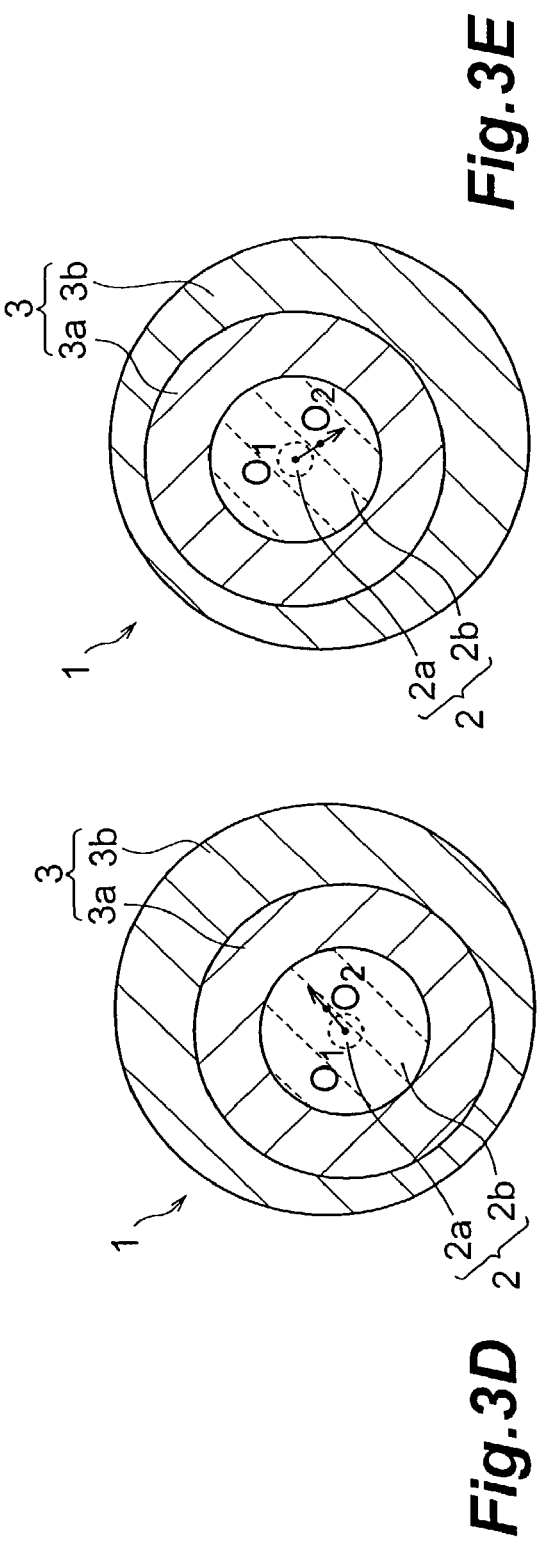

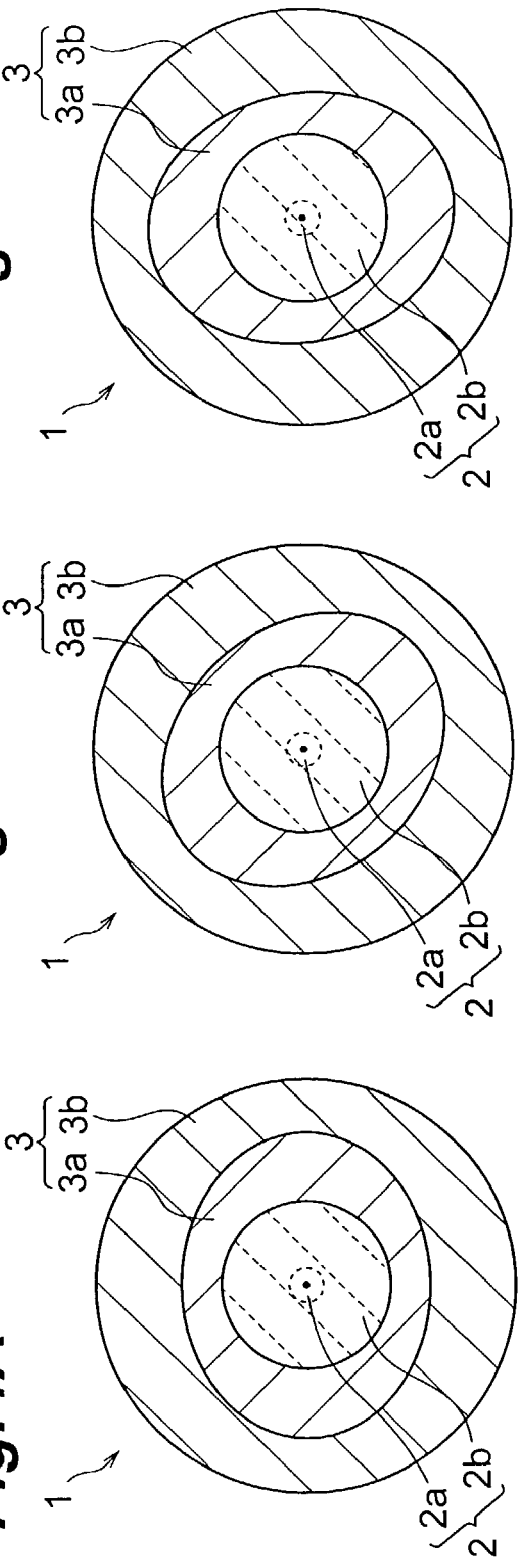

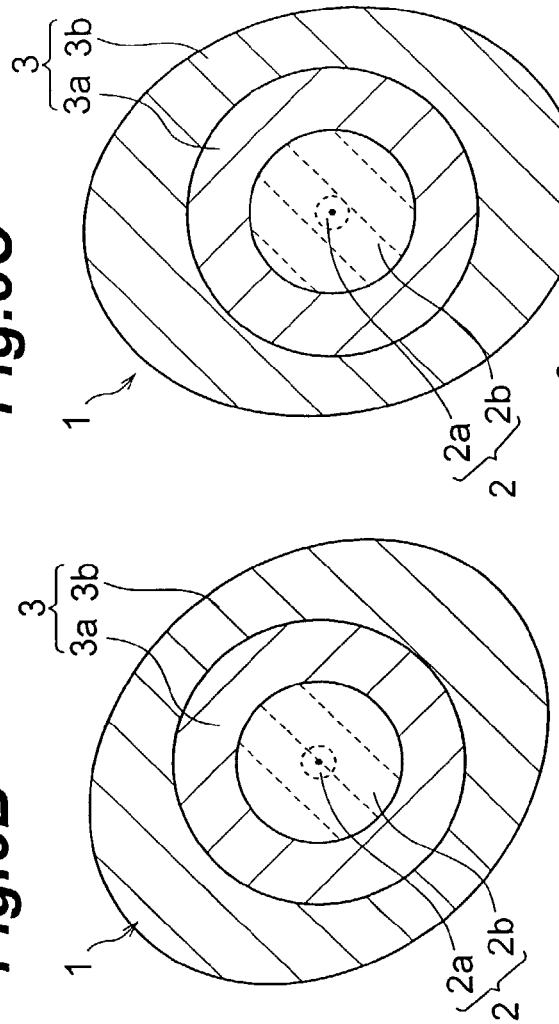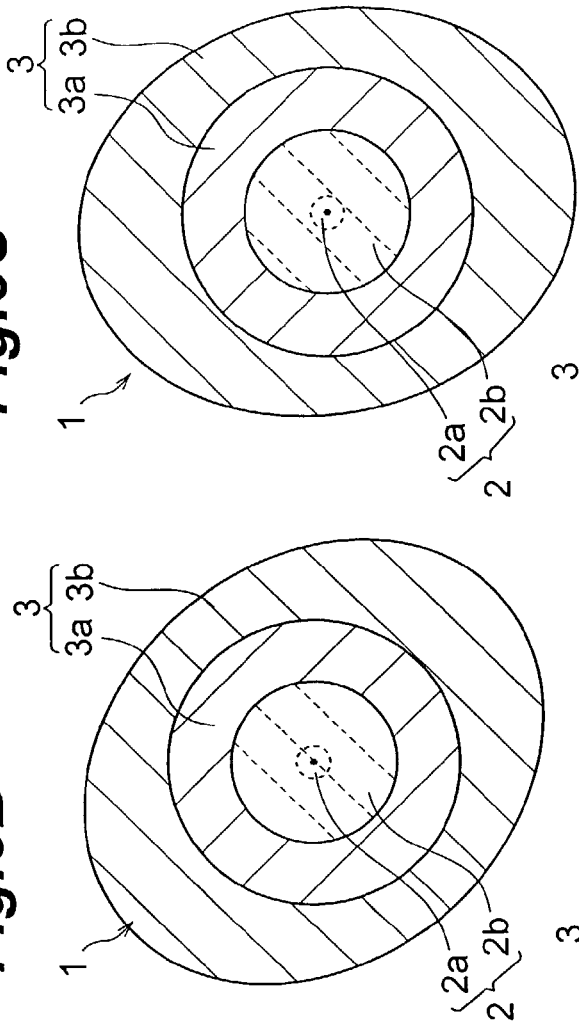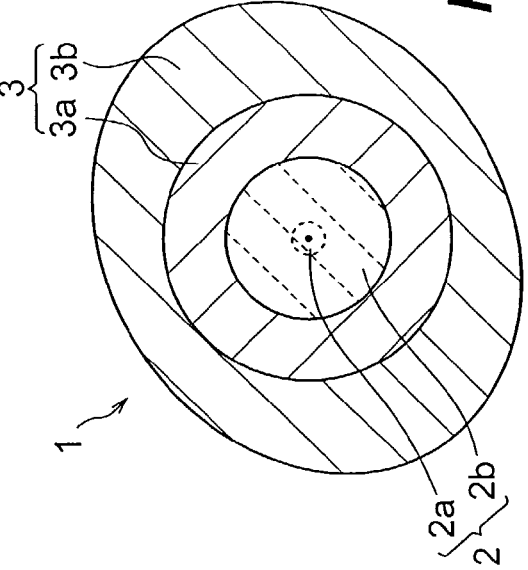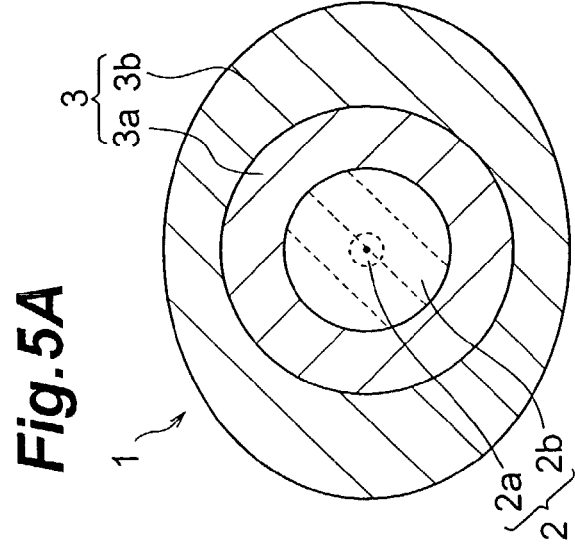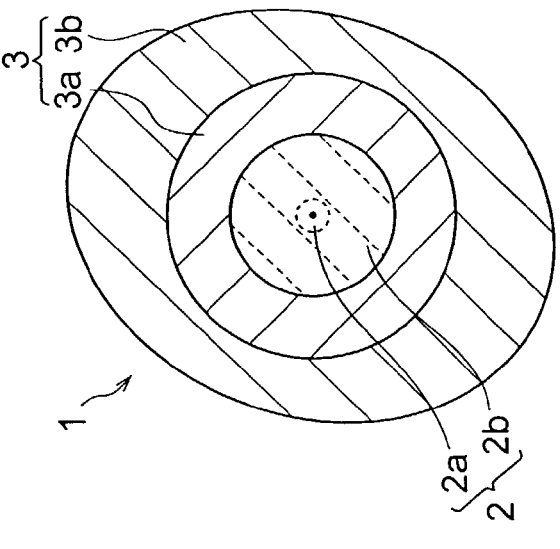

OPTICAL FIBER AND METHOD OF MANUFACTURING THE OPTICAL FIBER

TECHNICAL FILED

The present invention relates to an optical fiber capable of compensating polarization mode dispersion effectively, and a method of manufacturing the same.

BACKGROUND OF THE INVENTION

In recent years, as a wave length division multiplexing (WDM) transmission and an optical amplification technology progress, while an effective core area (Aeff) of an optical fiber has been scaled up, a more reduction of a polarization mode dispersion (PMD) characteristic has been desired. The polarization mode dispersion characteristic is caused by a transmission speed difference of optical signals between polarization waves perpendicular to each other, and depends on the symmetry of a refractive index distribution of the optical fiber. To be more specific, as the cross section shape of the refractive index distribution in a core portion (light propagation portion), through which a major part of light propagates, is closer to a perfect circle, the PMD characteristic in terms of the optical fiber itself becomes better. On the contrary, when the cross section shape thereof is uncircularized, the PMD characteristic becomes worse. Therefore, in the manufacture of the optical fiber, various contrivances for achieving a out-of-roundness of the cross section shape of the refractive index distribution in the core portion to acquire a good polarization mode dispersion characteristic have been made.

DISCLOSURE OF THE INVENTION

However, though the cross section shape of the refractive index distribution in the core portion of the optical fiber can be made close to the perfect circle, force is applied to the optical fiber from the outside, and a stress originating from this external force is generated, thus causing double refraction. As a result, there is a problem that the light propagation portion is uncircularized and the polarization mode dispersion characteristic is deteriorated. The application of the stress to the optical fiber depends on placement states of the optical fiber (for example, a spool winding, a ribbon/loose tube, a cable wound around a drum, a cable after laying and the like).

Accordingly, an object of the present invention is to provide an optical fiber which can suppress deterioration of a polarization mode dispersion characteristic thereof to acquire a good polarization mode dispersion characteristic thereof.

To achieve the foregoing object, the optical fiber according to the present invention comprises a glass portion having a core and a cladding; and one or more covering layers formed around the glass portion, wherein an arrangement form of the covering layer with respect to the glass portion on a cross section perpendicular to a longitudinal direction of the optical fiber is continuously changed in a longitudinal direction of the optical fiber.

The change of the arrangement form is performed in such a manner that a center of the glass portion and a center of the covering layer on a cross section perpendicular to a longitudinal direction of the optical fiber are decentered from each other, and a decenter direction on the cross section is changed in the longitudinal direction of the optical fiber.

The covering layer is formed to be a two-layered structure composed of an internal covering layer and an external covering layer, and at least one of centers of the internal and external covering layers may be decentered from the center of the glass portion.

A decenter amount, which is a distance between the center of the glass portion and the center of the covering layer, should be set to 12.5 μm or more.

The change of the arrangement form may be performed in such a manner that an outer peripheral shape of the covering layer in cross section perpendicular to the longitudinal direction of the optical fiber is uncircularized, and the the outer peripheral shape of the covering layer in cross section, which is uncircularized, is changed in the longitudinal direction of the optical fiber.

When the covering layer is formed to be the two-layered structure composed of the internal covering layer and the external covering layer, an outer peripheral shape in cross section, which is the boundary surface between the internal and external covering layers, is uncircularized, and an arrangement of the shape thereof is changed in the longitudinal direction of the optical fiber.

In this case, out-of-roundness of the covering layer, which is uncircularized, should be set to 5.0 μm or more.

The change of the arrangement form of the covering layer should be made with a periodicity in the longitudinal direction of the optical fiber. The periodicity should preferably be 0.5 m or less, and more preferably 0.2 m or less. The periodicity itself may be changed in the longitudinal direction.

The optical fiber according to the present invention can be manufactured in such a manner by drawing a bare optical fiber from a rotating preform; passing the drawn optical fiber through a die in a state where the drawn bare optical fiber rotates while describing a predetermined minute circle and coating resin onto an outer periphery of the drawn bare optical fiber with this die, and curing the coated resin.

Alternatively, the optical fiber according to the present invention may be manufactured in such a manner by drawing a bare optical fiber from a preform; passing the drawn bare optical fiber through a die which rotates with a center thereof deviating from a center of the optical fiber and coating resin onto an outer periphery of the bare optical fiber with this die; and curing the coated resin.

The optical fiber according to the present invention can be manufactured also in such a manner by drawing a bare optical fiber from a preform; passing the drawn bare optical fiber through a die which is arranged with a center thereof deviating from a center of the optical fiber and coating resin onto an outer periphery of the bare optical fiber with this die; swinging the optical fiber coated with the resin after passing through the die, thereby twisting the preform and the bare optical fiber, which are positioned on an upstream; and curing the coated resin.

A shape of an ejection port of the die may be uncircularized.

According to the optical fiber of the present invention suppresses continuity in the longitudinal direction of a vector of a stress applied to the optical fiber by decentering the covering layer with respect to the glass portion and making the covering layer uncircular, whereby deterioration of the polarization mode dispersion characteristic can be prevented, and a good polarization mode dispersion characteristic in the longitudinal direction of the optical fiber can be acquired as a whole. Moreover, according to the method of manufacturing an optical fiber of the present invention, the foregoing optical fiber can be suitably manufactured.

BRIEF DESCRIPTIONS OF THE DRAWINGS

FIGS. 2A to 2E are transverse cross section views of a first embodiment of the optical fiber according to the present invention;

FIGS. 3A to 3E are transverse cross section views of a second embodiment of the optical fiber according to the present invention;

FIGS. 4A to 4E are transverse cross section views of a third embodiment of the optical fiber according to the present invention;

FIGS. 5A to 5E are transverse cross section views of a fourth embodiment of the optical fiber according to the present invention;

BEST MODE FOR CARRYING OUT THE INVENTION

Figure 1:
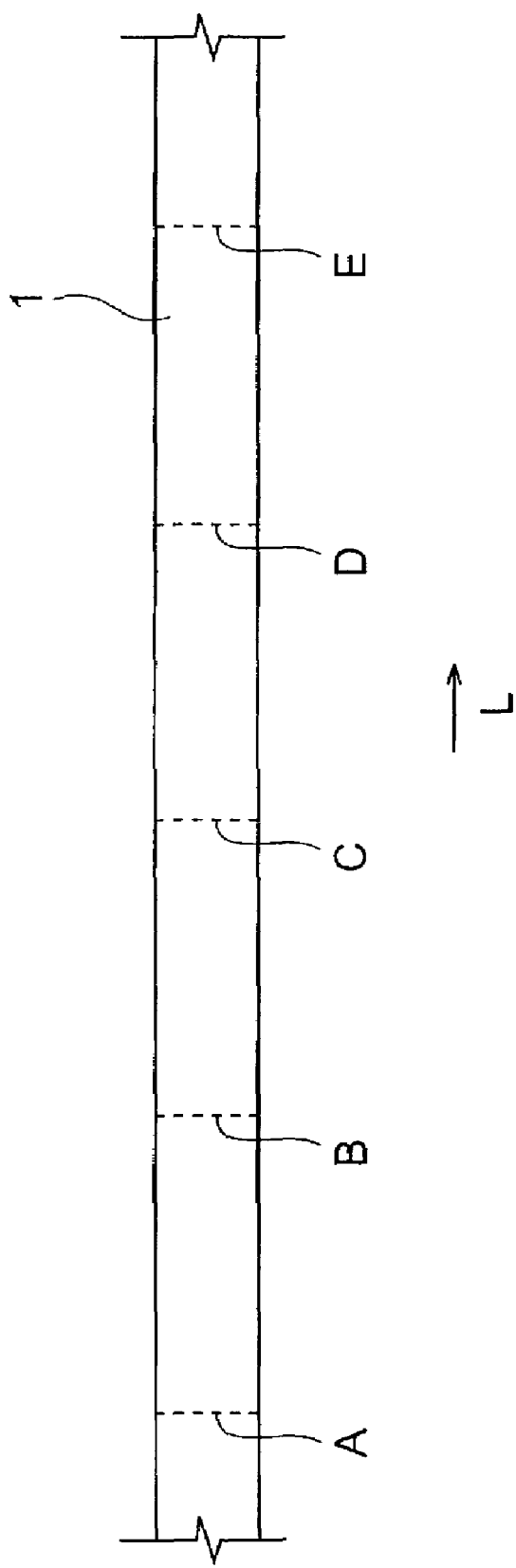
FIG. 1 is a side view of an optical fiber according to the present invention.

Embodiments of an optical fiber of the present invention will be described with reference to the accompanying drawings. To facilitate the comprehension of the explanation, the same reference numerals denote the same parts, where possible, throughout the drawings, and a repeated explanation will be omitted.

FIG. 1 is an external view of the optical fiber 1 according to the present invention. The optical fiber according to the present invention has a feature in the shape of a transverse section and the change in a longitudinal direction. Accordingly, different positions of the optical fiber in the longitudinal direction are denoted by the symbols A, B, C, D and E, respectively as shown in FIG. 1, and descriptions are made in the embodiments to be described below with reference to the cross sections at the respective positions thereof. The symbols A, B, C, D and E assigned to the respective ends of the reference numerals indicate the transverse cross sections in the positions A, B, C, D and E, which are the cross section views in the sections perpendicular to the longitudinal direction of the optical fiber 1.

First Embodiment

The optical fiber 1 of this embodiment comprises a glass portion 2 including a core 2a having a high refractive index and a cladding 2b having a low refractive index, which is formed around the core 2a, and a covering layer 3, which is composed of an internal covering layer 3a having a low Young's modulus and an external covering layer 3b having a high Young's modulus. An external diameter of the glass portion 2 is 125 μm, an external diameter of the internal covering layer 3a ranges from 170 to 200 μm, and an external diameter of the external covering layer 3b ranges from 235 to 265 μm. Any of the internal and external covering layers 3a and 3b is a resin covering layer using ultraviolet-curing resin. The glass portion 2, the internal covering layer 3a and the external covering layer 3b assume a circular shape on a section (transverse plane) perpendicular to the longitudinal direction (extending direction) of the optical fiber 1, the circular shape having an out-of-roundness approximately equal to zero.

Moreover, the center of the glass portion 2 and the center of the external surface of the external covering layer 3b are approximately coincident with each other as the center $O_1$. On the contrary, the center $O_2$ of the boundary plane of the internal covering layer 3a and the external covering layer 3b is decentered from the center $O_1$. In FIGS. 2A to 2E, the direction in which the center $O_2$ decenters from the center $O_1$ (hereinafter the direction is referred to as a decenter direction) is indicated by the arrow line extending from the center $O_1$. It is understood that the dencentering direction is changed in accordance with the longitudinal direction of the optical fiber 1. In this embodiment, the decenter direction is rotated in a certain direction (clockwise in FIGS. 2A to 2E) along the longitudinal direction (direction of the arrow L in FIG. 1) of the optical fiber 1.

As described above, generally, an optical fiber is often applied with a predetermined lateral pressure also from the outside thereof depending on its install state. The lateral pressure from the outside of the optical fiber acts on the optical fiber almost from a certain direction. For example, in a state where the optical fiber is wound around a spool, the lateral pressure acts on the optical fiber in a direction perpendicular to the body of the spool. In a state where the optical fiber is formed to be a tape-like shape to be accommodated in a slot, the lateral pressure acts thereon in a direction perpendicular to the bottom of the slot.

The lateral pressure acting on the optical fiber from the outside thereof causes a stress to act on the glass portion through the covering layer, thus causing double refraction. At this time, when the stress acts on the glass portion from a certain direction along the longitudinal direction of the optical fiber, a refractive index distribution of a light propagation portion (core portion) of the optical fiber is uncircularized as a result of the double refraction, and polarization mode dispersion occurs. Since the polarization mode dispersion arises from the lateral pressure from the outside of the optical fiber, the polarization mode dispersion inevitably occurs even if the optical fiber itself has a structure causing no polarization mode dispersion.

Herein, since the glass portion 2 and the internal covering layer 3a are decentered from each other in the optical fiber 1 of this embodiment, continuity in the longitudinal direction of the vector of the stress applied to the optical fiber 1 is controlled, and hence deterioration of the polarization mode dispersion characteristic can be prevented.

Second Embodiment

In this embodiment, as shown in FIGS. 3A to 3E, the center of the glass portion 2 and the center of the internal covering layer 3a are approximately coincident with each other as the center $O_1$. On the contrary, the center $O_2$ of the external covering layer 3b is decentered from the center $O_1$. The decenter direction (arrow direction in FIGS. 3A to 3E) is changed in the longitudinal direction of the optical fiber 1. Particularly, in this embodiment, the decenter direction is rotated in a certain direction (clockwise in FIGS. 3A to 3E) along the longitudinal direction (direction of the arrow L in FIG. 1) of the optical fiber 1.

Since the glass portion 2 and the external covering layer 3b are decentered from each other in the optical fiber 1 of this embodiment, the continuity in the longitudinal direction of the stress vector applied to the optical fiber 1 is consequently controlled. Also with such a configuration, similarly to the foregoing first embodiment, deterioration of the polarization mode dispersion characteristic is prevented by controlling the continuity in the longitudinal direction of the stress vector applied to the optical fiber 1, and, as a whole, the polarization mode characteristic in the longitudinal direction of the optical fiber 1 can be improved.

Although the decenter direction is changed so as to rotate in the certain direction along the longitudinal direction of the optical fiber 1 in the foregoing first and second embodiments, the style of the change of the decenter direction is not limited as such. For example, the direction of the rotation may be inverted alternately clockwise and counterclockwise. Furthermore, in all cases, the decenter direction need not to be rotated or inverted at certain intervals, and the decenter direction may be rotated or inverted at odd intervals.

When the decenter direction is rotated along the longitudinal direction of the optical fiber 1, the rotation of the decenter direction should be made twice or more per 1 m, and the rotation thereof should more preferably be made five times or more per 1 m. Specifically, the cycle of the rotation of the decenter direction should be set to 0.5 m or less, and should more preferably be set to 0.2 m or less. When the cycle of the rotation of the decenter direction exceeds 0.5 m, the change of the decenter amount in the longitudinal direction is insufficient, and it is impossible to acquire a good polarization mode dispersion characteristic. Furthermore, the reason why the change of the decenter amount is set to 0.2 m or less is that the change of the decenter amount in the longitudinal direction can be fully acquired and the effect of the acquisition of the improved polarization mode dispersion characteristic can be sufficiently achieved.

Furthermore, the foregoing decenter amount (distance X in FIGS. 2A and 3A) should be preferably set to 12.5 μm or more. If the decenter amount is less than 12.5 μm, the change of the decenter amount in the longitudinal direction is insufficient, and it is impossible to acquire a good polarization mode dispersion characteristic.

Third Embodiment

In this embodiment, as shown in FIGS. 4A to 4E, the outer peripheral shape of the internal covering layer 3a in cross section (perpendicular to the longitudinal direction of the optical fiber 1), that is, the shape of the boundary surface between the internal covering layer 3a and the external covering layer 3b, is uncircularized. "Uncircularize" means that the shape is intentionally made not to be a perfect circle. Specifically, the out-of-roundness of the outer periphery of the internal covering layer 3a in cross section is intentionally made to be large on the cross section perpendicular to the longitudinal direction of the optical fiber 1. Herein, the out-of-roundness is defined as a difference between the maximum diameter of an inscribed circle and the minimum diameter of a circumscribed circle. In this embodiment, the outer peripheral shape of the internal covering layer 3a in cross section is made to be elliptical as one mode of uncircularize.

The outer peripheral shape of the internal covering layer 3a in cross section, which is made to be elliptical, is changed in the longitudinal direction of the optical fiber 1. To be more specific, in this embodiment, the direction of the major axis of the ellipse rotates in a certain direction (clockwise in FIGS. 4A to 4E) along the longitudinal direction of the optical fiber 1. As described above, the optical fiber 1 of the embodiment has the internal covering layer 3a, in which the outer peripheral shape in cross section is uncircularized. Accordingly, the continuity in the longitudinal direction of the stress vector applied to the optical fiber 1 is suppressed, and hence the deterioration of the polarization mode dispersion characteristic is prevented. Thus, it is possible to acquire the good polarization mode dispersion characteristic as a whole in the longitudinal direction of the optical fiber 1.

Fourth Embodiment

In this embodiment, the outer peripheral shape of the external covering layer 3b in cross section (cross sections of FIGS. 5A to 5E), which is perpendicular to the longitudinal direction (extending direction) of the optical fiber 1, is uncircularized. In the cross section perpendicular to the longitudinal direction of the optical fiber 1, the out-of-roundness of the external covering layer 3b is made to be large. In this embodiment, the outer peripheral shape of the external covering layer 3b in cross section is made to be elliptical as one mode of uncircularize.

The outer peripheral shape of the external covering layer 3b in cross section, which is made to be elliptical, is changed in the longitudinal direction of the optical fiber 1. Particularly, in this embodiment, the direction of the major axis of the ellipse rotates in the certain direction (clockwise in FIGS. 5A to 5E) along the longitudinal direction of the optical fiber 1. Since the optical fiber 1 of this embodiment has the external covering layer 3b which is uncircularized, the continuity in the longitudinal direction of the stress vector applied to the optical fiber 1 is suppressed, and the deterioration of the polarization mode dispersion characteristic is prevented. Thus, the polarization mode dispersion characteristic in the longitudinal direction of the optical fiber 1 can be improved as a whole.

In the foregoing third and fourth embodiments, the respective the outer peripheral shapes of the internal and external covering layers 3a and 3b in cross section, which are uncircularized, are not changed in the longitudinal direction of the optical fiber 1, but the respective major axis of the ellipses of the internal and external covering layers 3a and 3b in cross section changes so as to rotate in the certain direction. However, the mode of the change is not limited as such. For example, the direction of the rotation of the major axis of the ellipse maybe alternately inverted. Also in any case, the rotation of the major axis of the ellipse and the inversion of the rotation thereof need not to be performed at certain intervals, but may be performed at odd intervals. The outer periphery of the covering layer in cross section is not only made to be an elliptical shape, but also may be made to be other shapes such as an egg-like shape. Moreover, the outer peripheral shape of the covering layer in cross section is not changed by rotating the direction of the major axis of the ellipse, but a change from an elliptical shape to an egg-like shape maybe adopted. Alternatively, a technique in which a ratio of the major axis of the ellipse to the minor axis thereof is changed may be conceived.

When the uncircularized shape is rotated in the longitudinal direction of the optical fiber 1, the rotation should be preferably made twice or more per 1 m (the cycle is 0.5 m or less). The rotation should be more preferably made five times or more per 1 m (the cycle is 0.2 m or less). The reasons of this are as follows. When the rotation is made less than two times (the cycle exceeds 0.5 m), the change of the state where the uncircularized shape in the longitudinal direction of the optical fiber 1 is insufficient, it is impossible to acquire a good polarization mode dispersion characteristic, and furthermore, since the state where the outer peripheral shape of the external covering layer in cross section is uncircularized in the longitudinal direction of the optical fiber is sufficiently changed by setting the rotation number to be 5 rotations/m or more (the cycle is 0.2 m or less), effects that a good polarization mode dispersion characteristic is acquired can be achieved.

Moreover, the out-of-roundness accompanied with uncircularization described above should preferably be set to 5.0 μm or more. When the out-of-roundness is less than 5.0 μm, the change of the state where the outer peripheral shape of the external covering layer in cross section, which is uncircularized, in the longitudinal direction of the optical fiber is insufficient, and hence a good polarization mode dispersion characteristic cannot be acquired.

Fifth Embodiment

Figure 6:
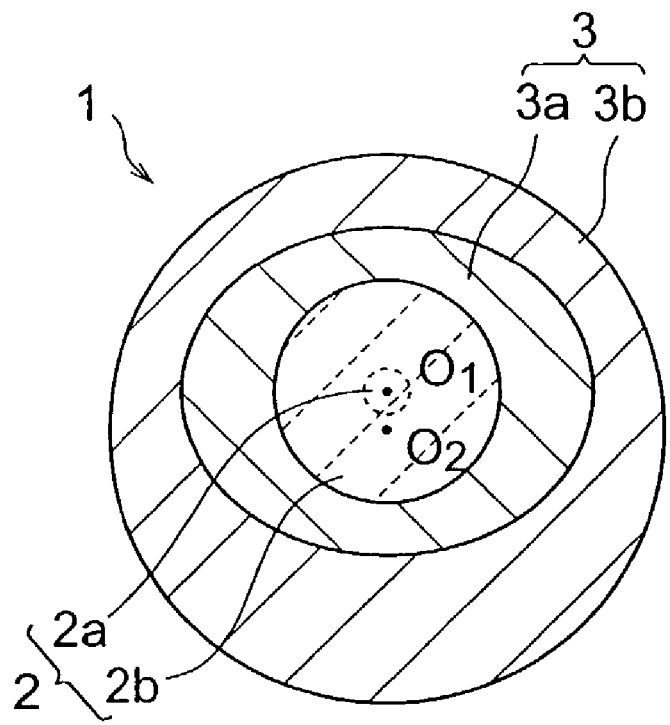
FIG. 6 and FIG. 7 are transverse cross section views of fifth and sixth embodiments of the optical fiber of the present invention, respectively.

The fifth embodiment aims at the improvement of the polarization mode dispersion characteristic by the foregoing decentering of the covering layer 3 as well as the improvement of the polarization mode dispersion characteristic by uncircularization of the covering layer 3. In the fifth embodiment illustrated in FIG. 6, the centers of the glass portion 2 and the internal covering layer 3a are approximately coincident with each other as the center $O_1$ on the cross section perpendicular to the longitudinal direction of the optical fiber 1. On the contrary, the center $O_2$ of the external covering layer 3b is decentered from the center $O_1$. Furthermore, the outer peripheral shape of the internal covering layer 3a in cross section, which is perpendicular to the longitudinal direction of the optical fiber 1, that is, the boundary shape between the internal covering layer 3a and the external covering layer 3b, is uncircularized. Also with such a configuration, similarly to the first embodiment and the like, the deterioration of the polarization mode dispersion characteristic can be prevented by suppressing the continuity in the longitudinal direction of the stress vector applied to the optical fiber 1, and the polarization mode dispersion characteristic in the longitudinal direction of the optical fiber 1 can be improved as a whole.

Sixth Embodiment

Figure 7:
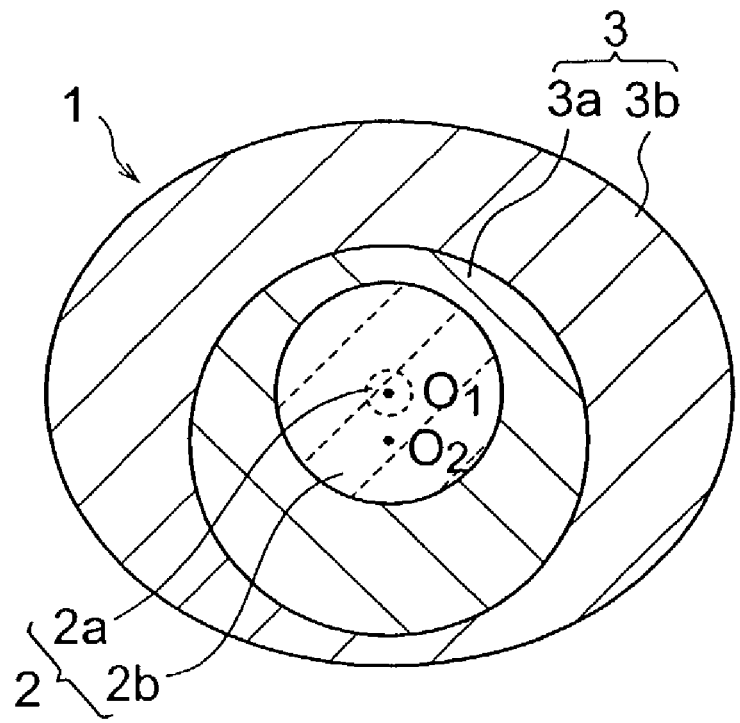

Similarly to the fifth embodiment, this embodiment also aims at both the improvement of the polarization mode dispersion characteristic by the foregoing decentering of the covering layer 3 as well as the improvement of the polarization mode dispersion characteristic by uncircularization of the covering layer 3. As shown in FIG. 7, the centers of the glass portion 2 and the external covering layer 3b are approximately coincident with each other as the center $O_1$. On the contrary, the center $O_2$ of the internal covering layer 3a is decentered from the center $O_1$. Furthermore, the outer peripheral shape of the external covering layer 3b in cross section, which is perpendicular to the longitudinal direction of the optical fiber 1, is uncircularized. Also with such a configuration, similarly to the foregoing first embodiment and the like, the deterioration of the polarization mode dispersion characteristic can be prevented by suppressing the continuity in the longitudinal direction of the stress vector applied to the optical fiber 1, and the polarization mode dispersion characteristic in the longitudinal direction of the optical fiber 1 can be improved as a whole.

Next, methods of manufacturing the foregoing optical fibers 1 will be described with reference to manufacturing apparatuses. First, the case where the covering layer 3 is decentered will be described.

Figure 8:
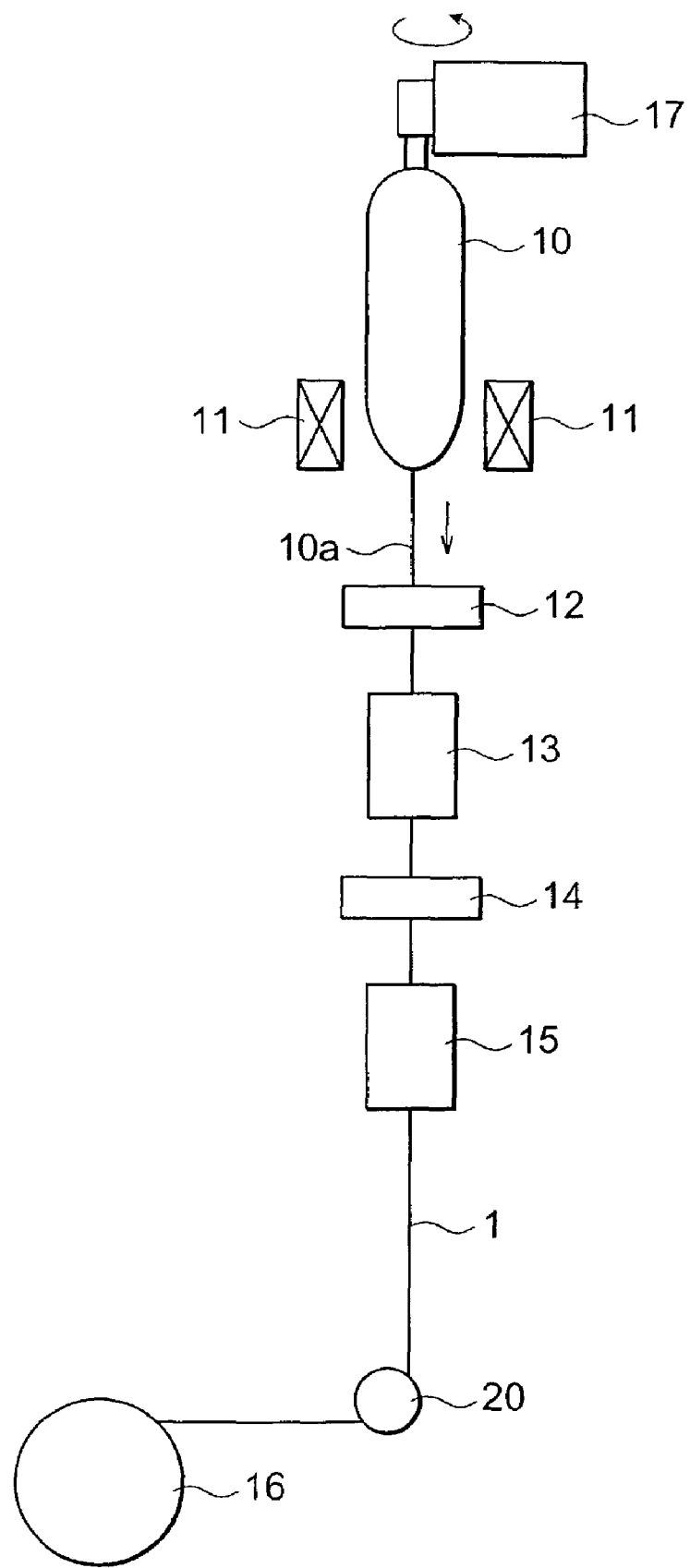
FIG. 8 to FIG. 14 are configuration views of manufacturing apparatuses for carrying out methods of manufacturing optical fibers according to the present invention.

The manufacturing apparatus of the foregoing optical fibers 1 illustrated in FIGS. 2A to 2E or FIGS. 3A to 3E is illustrated in FIG. 8. The outline of the manufacturing apparatus is constructed on the basis of an ordinary optical fiber manufacturing apparatus. Specifically, an optical fiber preform 10 is attached to the apparatus, and the apparatus itself comprises a heater 11 for heating a lower end of the preform 10; a first coating device 12 for coating ultraviolet-curing resin onto a glass fiber 10a which is drawn from the preform 10, the ultraviolet-curing resin serving as the internal covering layer 3a; a first ultraviolet radiation furnace 13 for curing the resin coated by the first coating device 12; a second coating device 14 for coating ultraviolet-curing resin onto the glass fiber 10a on which the internal covering layer 3a is formed, the ultraviolet-curing resin serving as the external covering layer 3b; a second ultraviolet radiation furnace 15 for curing the ultraviolet-curing resin coated by the second coating device 14; and a reel 16 for winding the optical fiber 1 on which the two-layered covering layer is formed.

The heater 11, the first coating device 12, the first ultraviolet radiation furnace 13, the second coating device 14, the second ultraviolet radiation furnace 15, and the reel 16 are placed sequentially from the upstream side to the downstream side on the fiber-drawing path for the optical fiber 1. To decenter the covering layer 3 (the internal covering layer 3a or the external covering layer 3b) from the glass portion 2, a driving device 17 for rotating the preform is provided in a fitting portion of the preform 10. The preform 10 is rotated so that the center axis of the drawn optical fiber (glass fiber 10a) describes a minute circle. As a result, since the center axis of the glass fiber 10a deviates from the centers of the ejection ports of the first and second coating devices 12 and 14, the covering layer 3 (the internal covering layer 3a or the external covering layer 3b) is decentered, and the covering layer 3 can be changed in the longitudinal direction of the optical fiber 1.

Figure 9:
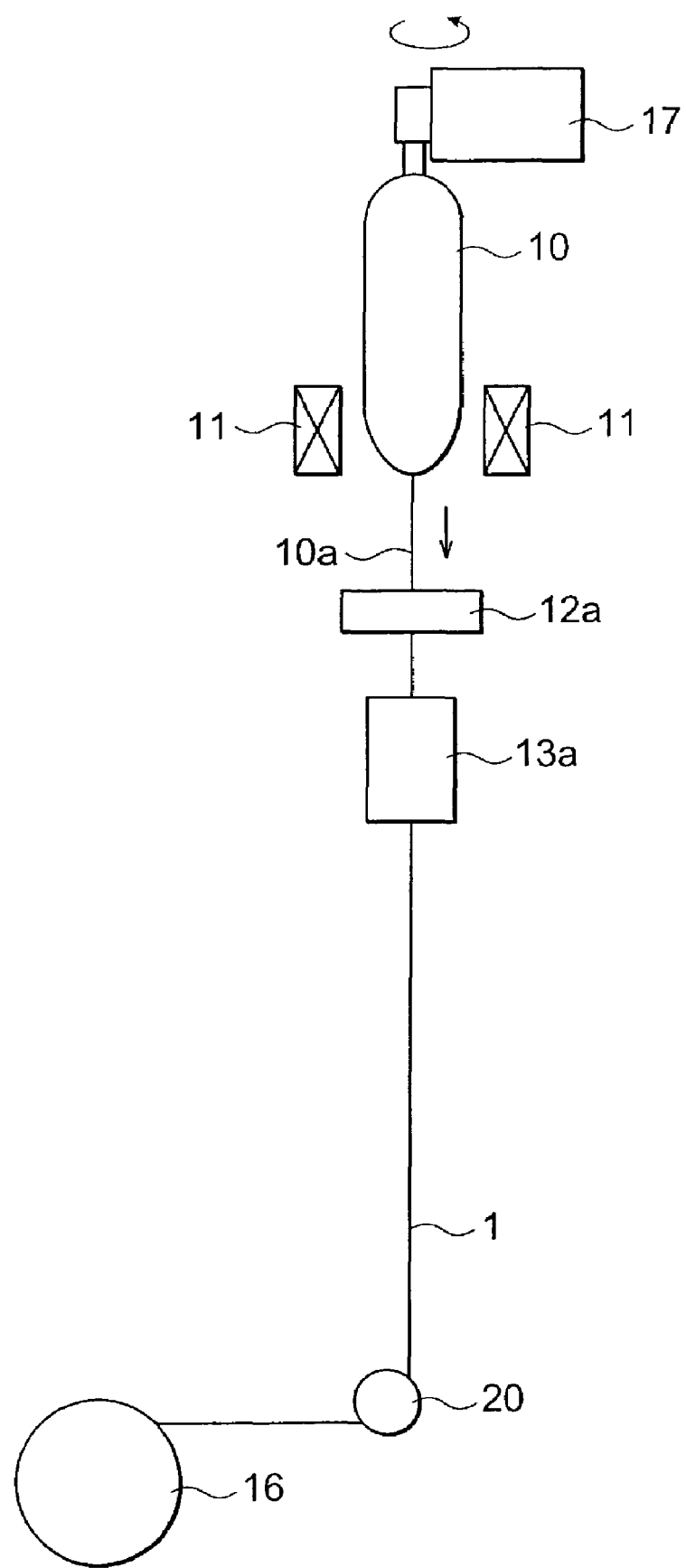

The modification of the foregoing manufacturing apparatus of FIG. 8 is shown in FIG. 9. In the manufacturing apparatus shown in FIG. 9, ultraviolet-curing resin forming the internal covering layer 3a and ultraviolet-curing resin forming the external covering layer 3b are coated onto the glass fiber 10a within the coating device 12a at about the same time. The coating device 12a can coat a plurality of layers simultaneously. Thereafter, in the ultraviolet radiation furnace 13a, the ultraviolet-curing resin forming the internal covering layer 3a and the ultraviolet-curing resin forming the external covering layer 3b are cured at about the same time.

Also herein, to decenter the covering layer 3 (the internal covering layer 3a or the external covering layer 3b), the driving device 17 for rotating the preform is arranged in the fitting portion of the preform 10. The preform 10 is rotated by this driving device 17 so that the center axis of the drawn optical fiber (glass fiber 10a) describes a minute circle. As a result, since the glass fiber 10a deviates from the center of the ejection port of the coating device 12a, the covering layer 3 (the internal covering layer 3a or the external covering layer 3b) is decentered, and the covering layer 3 can be changed in the longitudinal direction of the optical fiber 1.

Figure 10:
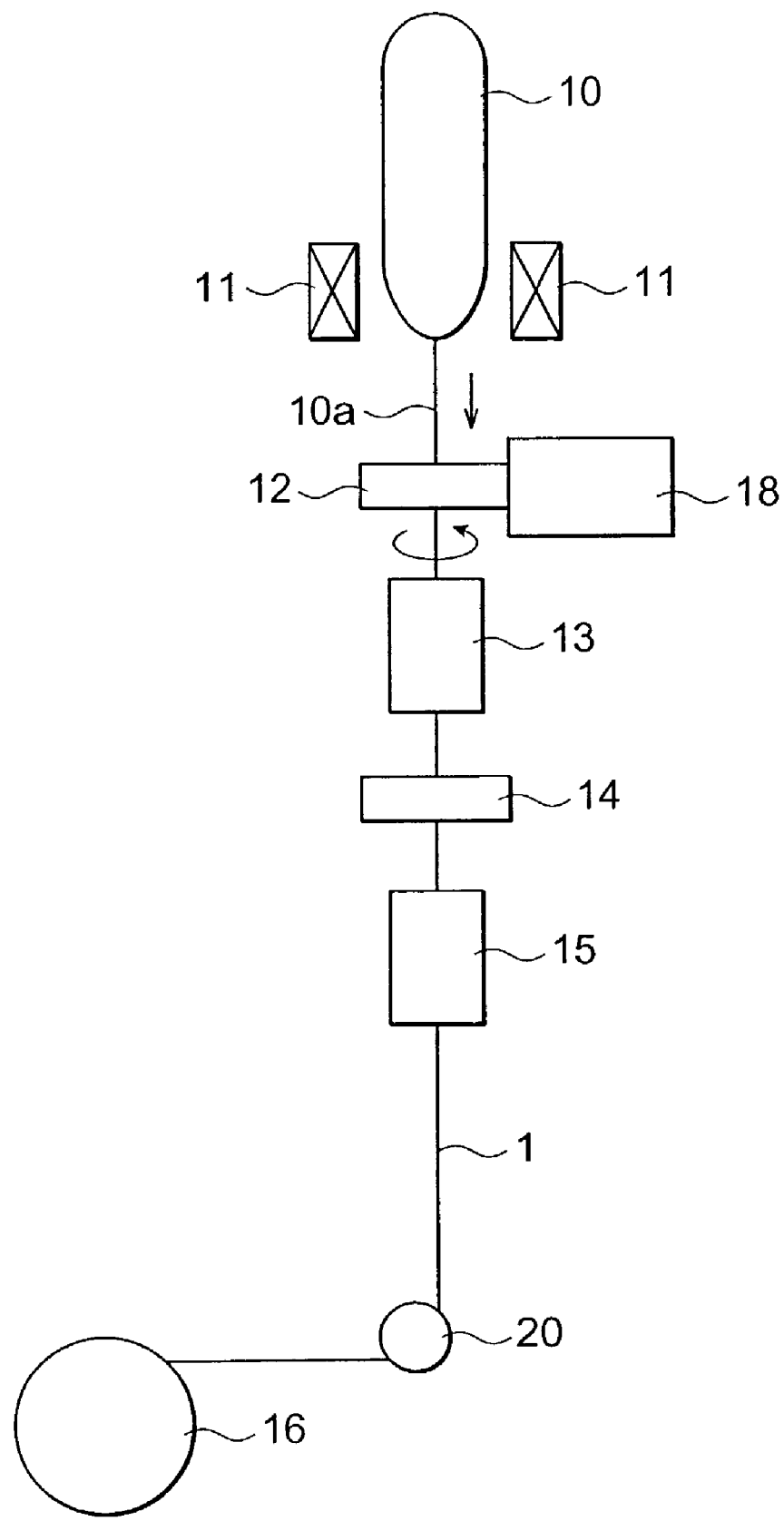

A manufacturing apparatus for manufacturing the optical fiber 1 shown in FIGS. 2A to 2E is shown in FIG. 10. In this embodiment, adjustment is made so that the center of the ejection port of the die in the first coating device 12, which coats the resin for forming the internal covering layer 3a, slightly deviates from the center of the axis of the drawn optical fiber (glass fiber 10a). Accompanied with the first coating device 12, the driving device 18 for rotating the die on a plane perpendicular to the fiber-drawing direction of the drawn optical fiber (glass fiber 10a) is also arranged.

The die of the first coating device 12, that is, the ejection port thereof, is rotated by the driving device 18 during the optical fiber (glass fiber 10a) drawing. As a result, since the center of the ultraviolet-curing resin coated by the first coating device 12 is decentered, the internal covering layer 3a is decentered, and hence the internal covering layer 3a can be changed in the longitudinal direction of the optical fiber 1.

Figure 11:
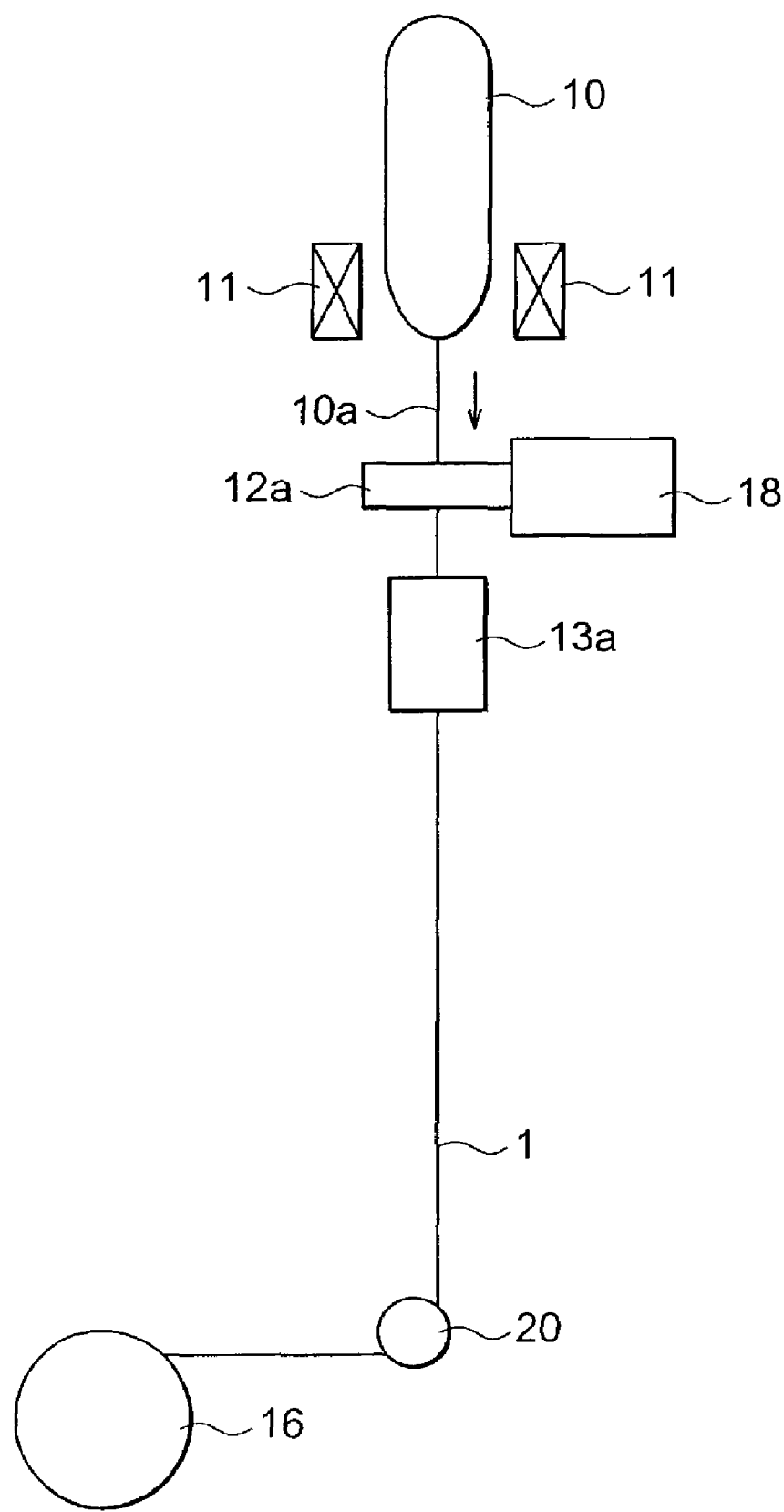

The modification of the foregoing manufacturing apparatus of FIG. 10 is shown in FIG. 11. In the manufacturing apparatus shown in FIG. 11, ultraviolet-curing resin forming the internal covering layer 3a and ultraviolet-curing resin forming the external covering layer 3b are coated onto the glass fiber 10a within the coating device 12a at about the same time. The coating device 12a can coat a plurality of layers simultaneously. Thereafter, in the ultraviolet radiation furnace 13a, the ultraviolet-curing resin forming the internal covering layer 3a and the ultraviolet-curing resin forming the external covering layer 3b are cured at about the same time.

Also in the modification, adjustment is made so that the center of the ejection port of the die in the coating device 12a, which coats the resin for forming the internal covering layer 3a, slightly deviates from the center axis of the drawn optical fiber (glass fiber 10a). Accompanied with the coating device 12a, the driving device 18 for rotating the die, which coats the resin for forming the internal covering layer 3a, on a plane perpendicular to the fiber-drawing direction of the drawn optical fiber (glass fiber 10a) is also arranged.

The die of the coating device 12a which coats the resin for forming the internal covering layer 3a, that is, the ejection port thereof, is rotated by the driving device 18 during the optical fiber (glass fiber 10a) drawing. As a result, since the center of the ultraviolet-curing resin, which is coated by the coating device 12a and forms the internal covering layer 3a, is decentered (at this time, the center of the ultraviolet-curing resin for forming the external covering layer 3b is not decentered), the internal covering layer 3a is decentered, and hence the internal covering layer 3a can be changed in the longitudinal direction of the optical fiber 1.

Figure 12:
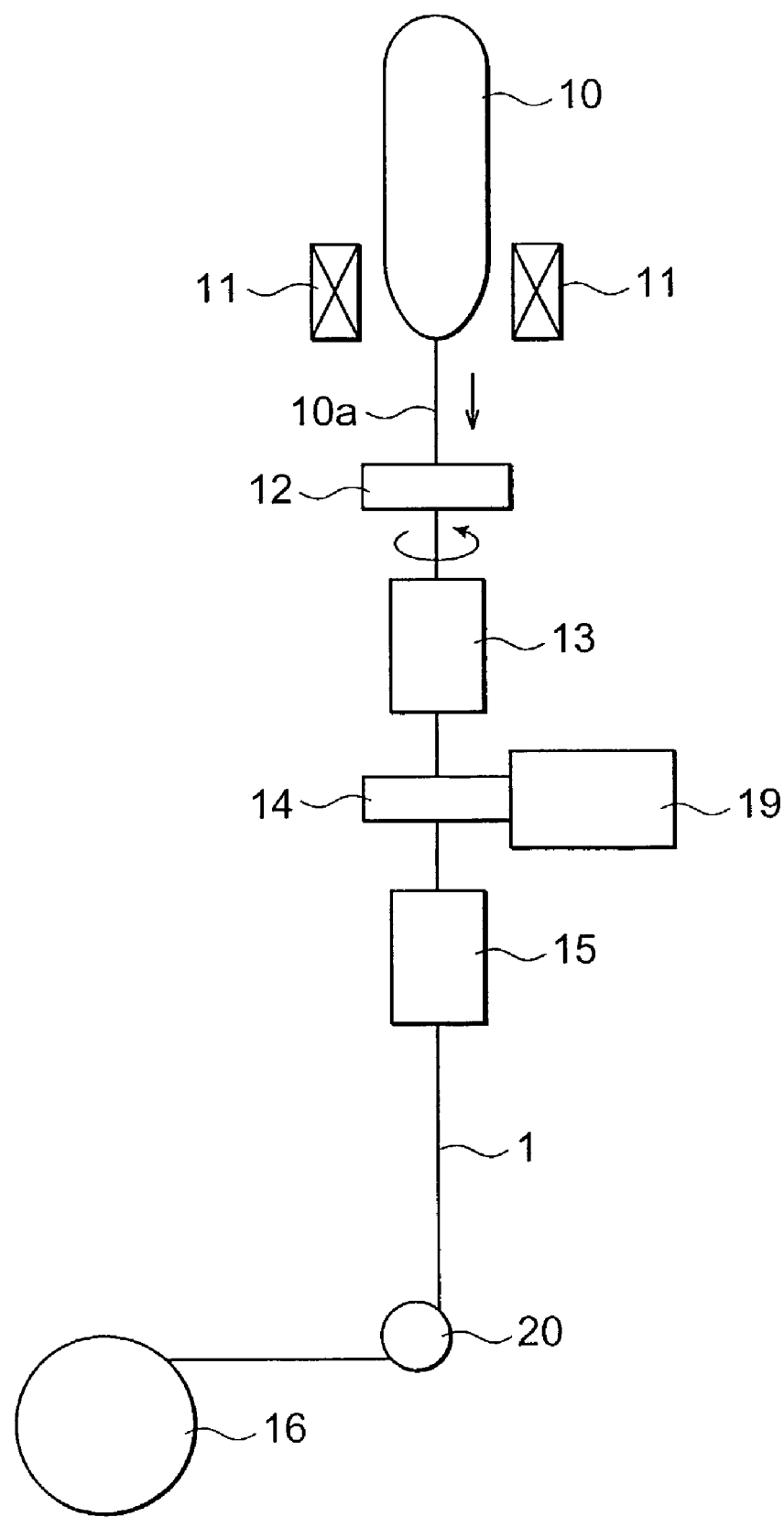

A manufacturing apparatus for manufacturing the optical fiber 1 shown in FIGS. 3A to 3E is shown in FIG. 12. In this embodiment, adjustment is made so that the center of the ejection port of the die in the second coating device 14, which coats the resin for forming the external covering layer 3b, slightly deviates from the center axis of the drawn optical fiber (glass fiber 10a in which the internal covering layer 3a is formed). Accompanied with the second coating device 14, the driving device 19 for rotating the die on a plane perpendicular to the fiber-drawing direction of the drawn optical fiber (glass fiber 10a) is also arranged.

The die of the second coating device 14, that is, the ejection port thereof, is rotated by the driving device 19 during the optical fiber (glass fiber 10a in which the internal covering layer 3a is formed) drawing. As a result, since the center of the ultraviolet-curing resin coated by the second coating device 14 is decentered, the external covering layer 3b is decentered, and hence the external covering layer 3b can be changed in the longitudinal direction of the optical fiber 1.

Note that, if the driving device 18 is designed such that the die which coats the resin for forming the external covering layer 3b is rotated on a plane perpendicular to the fiber-drawing direction of the drawn optical fiber (glass fiber 10a) in the manufacturing apparatus shown in FIG. 11, the optical fiber 1 shown in FIGS. 3A to 3E can also be manufactured by the manufacturing apparatus shown in FIG. 11.

Figure 13:
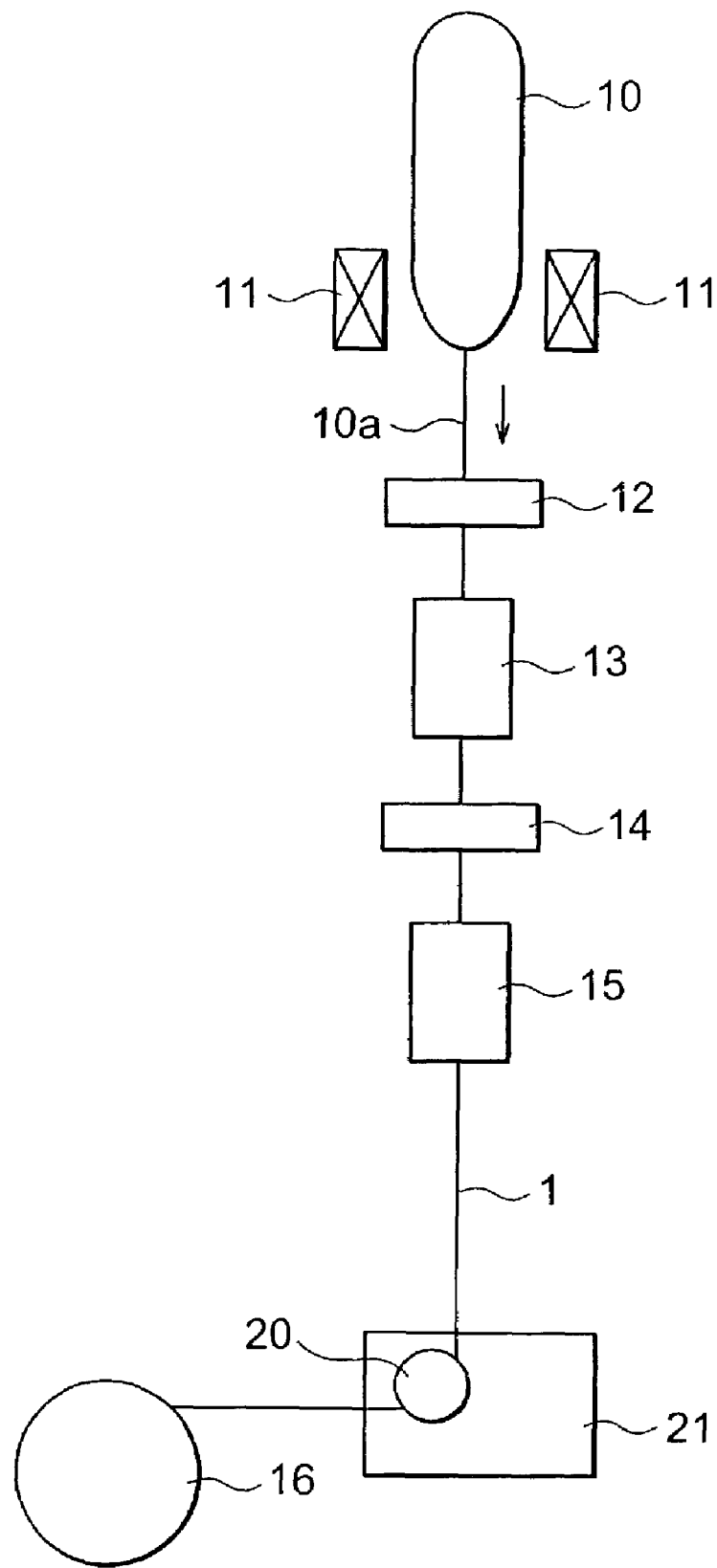

FIG. 13 shows another example of the manufacturing apparatus for manufacturing the optical fiber 1 shown in FIGS. 3. Also in this embodiment, adjustment is made so that the center of the ejection port of the die in the second coating device 14, which coats the resin for forming the external covering layer 3b, slightly deviates from the center of the drawn optical fiber (glass fiber 10a in which the internal covering layer 3a is formed). However, the manufacturing apparatus has no mechanism for rotating the die of the second coating device 14, but has a roller 20 swinging instead of this mechanism. A driving device 21 for swinging the roller 20 is arranged accompanied with the roller 20.

The roller 20 is positioned between the second ultraviolet radiation furnace 15 and the reel 16, and the drawn optical fiber contacts with the periphery plane of the roller 20. Herein, when the roller 20 is swung, the optical fiber 1 which contacts with the roller 20 moves while rolling on the periphery of the roller 20. A twist is applied to the optical fiber 1. The twist applied to the optical fiber 1 is propagated also to the up stream of the drawn optical fiber 1, and reaches to a portion of the ultraviolet-curing resin coated by the second coating device 14.

Therefore, since the ejection port of the die is decentered by the second coating device 14, the external covering layer 3b is decentered, and this decenter direction is changed in the longitudinal direction of the optical fiber 1 by the foregoing twist. Since the foregoing twist is applied so as to be inverted alternately, the decenter direction is also inverted alternately. Also with such a structure, the external covering layer 3b is decentered, and can be changed in the longitudinal direction of the optical fiber 1.

Figure 14:
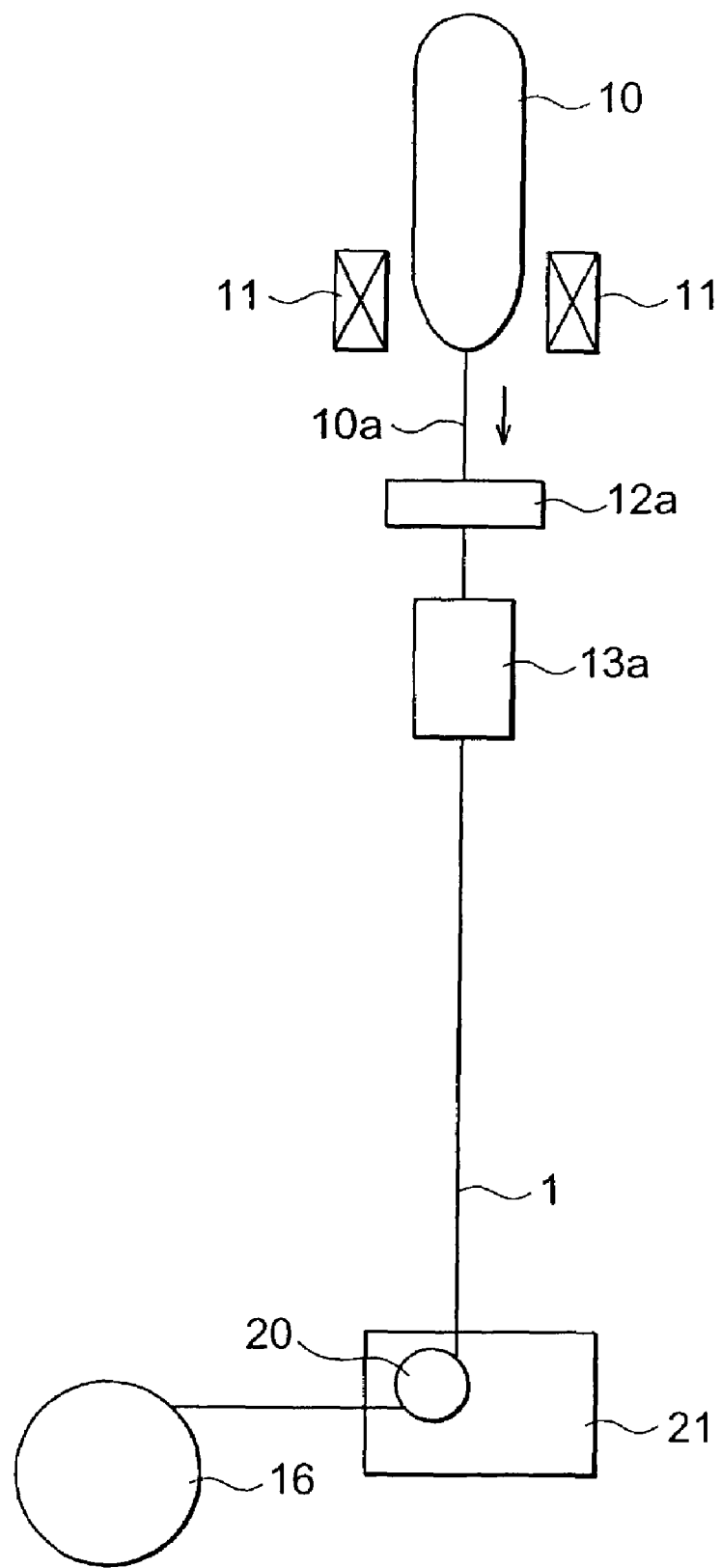

In FIG. 14, the modification of the foregoing manufacturing apparatus of FIG. 13 is shown. In the manufacturing apparatus shown in FIG. 14, ultraviolet-curing resin forming the internal covering layer 3a and ultraviolet-curing resin forming the external covering layer 3b are coated onto the glass fiber 10a within the coating device 12a at about the same time. The coating device 12a can coat a plurality of layers simultaneously. Thereafter, in the ultraviolet radiation furnace 13a, the ultraviolet-curing resin forming the internal covering layer 3a and the ultraviolet-curing resin forming the external covering layer 3b are cured at about the same time.

Also in the manufacturing apparatus of FIG. 14, adjustment is made so that the center of the ejection port of the die in the coating device 12a for coating the resin, which forms the external covering layer 3b, slightly deviates from the center of the drawn optical fiber (glass fiber 10a in which the internal covering layer 3a is formed). Moreover, there is no mechanism which rotates the die for coating the resin for forming the external covering layer 3b, and the roller 20 swinging is arranged instead of this mechanism. Moreover, accompanied with the roller 20, the driving device 21 for swinging the roller 20 is also arranged.

The roller 20 is positioned between the ultraviolet radiation furnace 13a and the reel 16, and the drawn optical fiber 1 contacts with the periphery plane of the roller 20. Herein, when the roller 20 is swung, the optical fiber 1 which contacts with the roller 20 moves while rolling on the periphery plane of the roller 20. A twist is applied to the optical fiber 1. The twist applied to the optical fiber 1 is propagated also to the upstream of the drawn optical fiber 1, and reaches to a portion of the ultraviolet-curing resin forming the external covering layer 3b coated by the coating device 12a.

Therefore, since the ejection port of the die which coats the resin for forming the external covering layer 3*b* is decentered in the coating device 12*a*, the external covering layer 3*a* is decentered and the decenter direction is changed in the longitudinal direction of the optical fiber 1 due to the foregoing twist. Since the foregoing twist is applied to the optical fiber 1 so as to be inverted alternately, the decenter direction is also inverted alternately. Also with such a structure, the external covering layer 3*b* is decentered, and the external covering layer 3*b* can be changed in the longitudinal direction of the optical fiber 1.

Next, the case where the shape of the covering layer 3 in cross section is uncircularized will be described.

A first example of a manufacturing apparatus itself is almost the same as that shown in FIG. 8. In accordance with the internal covering layer 3*a* or the external covering layer 3*b* in which the outer peripheral shape in cross section is intended to be uncircularized, the ejection port shape of the die of the first coating device 12 or the second coating device 14 is uncircularized (herein, elliptical). Therefore, the outer peripheral shape of the internal covering layer 3*a* or the external covering layer 3*b* in cross section is uncircularized, and the preform 10 is rotated by the driving device 17 positioned at the fitting portion of the preform 10, whereby the outer peripheral shape of the covering layer in cross section which was uncircularized can be changed in the longitudinal direction of the optical fiber 1. As a result, the outer peripheral shape of the covering layer 3 (the internal covering layer 3*a* or the external covering layer 3*b*) in cross section is uncircularized, and can be changed in the longitudinal direction of the optical fiber 1.

Alternatively, also by approximately the same apparatus as the manufacturing apparatus shown in FIG. 9, the outer peripheral shape of the covering layer 3 (the internal covering layer 3*a* or the external covering layer 3*b*) in cross section is uncircularized, and can be changed in the longitudinal direction of the optical fiber 1. In this manufacturing apparatus, the ultraviolet-curing resin for forming the internal covering layer 3*a* and the ultraviolet-curing resin for forming the external covering layer 3*b* are coated onto the glass fiber 10*a* within the coating device 12*a* at about the same time. The coating device 12*a* can coat a plurality of layers simultaneously. Thereafter, in the ultraviolet radiation furnace 13*a*, the ultraviolet-curing resin forming the internal covering layer 3*a* and the ultraviolet-curing resin forming the external covering layer 3*b* are cured at about the same time.

In accordance with the internal covering layer 3*a* or the external covering layer 3*b* in which the outer peripheral shape in cross section is intended to be made uncircular, the ejection port shape of the die in the coating device 12*a* for either the internal covering layer 3*a* or the external covering layer 3*b* is uncircularize (herein, elliptical). The preform 10 is rotated by the driving device 17 positioned at the fitting portion of the preform 10, whereby the outer peripheral shape of the covering layer in cross section, which was uncircularized, can be changed in the longitudinal direction of the optical fiber 1. As a result, the outer peripheral shape of the covering layer 3 (the internal covering layer 3*a* or the external covering layer 3*b*) in cross section is uncircularized, and can be changed in the longitudinal direction of the optical fiber 1.

Next, a method of manufacturing the optical fiber 1 shown in FIGS. 4A to 4E will be described. The basic constitution of the manufacturing apparatus used for this manufacturing method is approximately the same as the foregoing manufacturing apparatus shown in FIG. 10. The ejection port shape of the die in the first coating device 12 for forming the internal covering layer 3*a*, in which the shape thereof in cross section is intended to be uncircular, is uncircularized (herein, elliptical). Therefore, the outer peripheral shape of the internal covering layer 3*a* in cross section is uncircularized, and further the die, that is, the ejection port, of the first coating device 12 is rotated by the driving device 18 arranged concomitantly with the first coating device 12, whereby the outer peripheral shape of the internal covering layer 3*a* in cross section can be changed in the longitudinal direction of the optical fiber 1. As a result, the outer peripheral shape of the internal covering layer 3*a* in cross section is uncircularized, and can be changed in the longitudinal direction of the optical fiber 1.

Alternatively, also by approximately the same apparatus as the manufacturing apparatus shown in FIG. 11, the outer peripheral shape of the internal covering layer 3*a* in cross section is uncircularized, and can be changed in the longitudinal direction of the optical fiber 1. In this manufacturing apparatus, the ultraviolet-curing resin for forming the internal covering layer 3*a* and the ultraviolet-curing resin for forming the external covering layer 3*b* are coated onto the glass fiber 10*a* within the coating device 12*a* at about the same time. The coating device 12*a* can coat a plurality of layers simultaneously. Thereafter, in the ultraviolet radiation furnace 13*a*, the ultraviolet-curing resin forming the internal covering layer 3*a* and the ultraviolet-curing resin forming the external covering layer 3*b* are cured at about the same time.

In this manufacturing method, the ejection port shape of the die for ejecting the ultraviolet-curing resin forming the internal covering layer 3*a*, in which the outer peripheral shape thereof in cross section is intended to be uncircular, is uncircularized (herein elliptical). Accompanied with the coating device 12*a*, arranged is the driving device 18 which rotates the die in a plane perpendicular to the fiber-drawing direction of the drawn optical fiber 1 (glass fiber 10*a*). The die coats the ultraviolet-curing resin for forming the internal covering layer 3*a*.

The die of the coating device 12*a*, that is, the ejection port thereof, which coats the ultraviolet-curing resin forming the internal covering layer 3*a*, is rotated by the driving device 18 during the optical fiber (glass fiber 10*a*) drawing. As a result, since the surface shape of the ultraviolet-curing resin coated by the coating device 12*a*, which forms the internal covering layer 3*a*, in cross section is uncircularized, the outer peripheral shape of the internal covering layer 3*a* in cross section is uncircularized, and can be changed in the longitudinal direction of the optical fiber 1.

Next, a method of manufacturing the optical fiber 1 shown in FIGS. 5A to 5E will be described. The basic constitution of the manufacturing apparatus used for this manufacturing method is approximately the same as the foregoing manufacturing apparatus shown in FIG. 12. The ejection port shape of the die in the second coating device 14 for forming the external covering layer 3*b*, in which the outer peripheral shape thereof in cross section is intended to be uncircular, is uncircularized (herein, elliptical). Therefore, the outer peripheral shape of the external covering layer 3*b* in cross section is uncircularized, and further the die, that is, the ejection port, in the second coating device 14 is rotated by the driving device 19 arranged concomitantly with the second coating device 14, whereby the outer peripheral shape of the external covering layer 3*b* in cross section, which was uncircularized, can be changed in the longitudinal direction of the optical fiber 1. As a result, the outer peripheral shape of the external covering layer 3*b* in cross section is uncircularized, and can be changed in the longitudinal direction of the optical fiber 1.

In the manufacturing apparatus shown in FIG. 11, if the driving device 18 is designed such that the die which coats the resin forming the external covering layer 3b is rotated in a plane perpendicular to the fiber-drawn direction of the optical fiber (glass fiber 10a) formed by the fiber-drawing, the optical fiber 1 shown in FIGS. 5A to 5E can be manufactured by the manufacturing apparatus shown in FIG. 11.

Next, another example of the method of manufacturing the optical fiber 1 shown in FIGS. 5A to 5E will be described. The basic constitution of the manufacturing apparatus used for this manufacturing method is approximately the same as the foregoing apparatus of FIG. 13. Also in this embodiment, the ejection port shape of the die in the second coating device 14 forming the external covering layer 3b, in which the outer peripheral shape thereof in cross section is intended to be uncircular, is uncircularized (herein elliptical). However, the manufacturing apparatus has no mechanism for rotating the die of the second coating device 14, but has a roller 20 swinging instead of this mechanism. A driving device 21 for swinging the roller 20 is arranged accompanied with the roller 20.

The roller 20 is positioned between the second ultraviolet radiation furnace 15 and the reel 16, and the drawn optical fiber 1 contacts with the periphery plane of the roller 20. Herein, when the roller 20 is swung, the optical fiber 1 which contacts with the roller 20 moves while rolling on the periphery plane of the roller 20. A twist is applied to the optical fiber 1. The twist applied to the optical fiber 1 is propagated also to the upstream of the drawn optical fiber 1, and reaches to a portion of the ultraviolet-curing resin coated by the second coating device 14.

Therefore, since the ejection port of the die is uncircularized (elliptical) in the second coating device 14, the outer peripheral shape of the external covering layer 3b in cross section is uncircularized. The state where the outer peripheral shape of the external covering layer 3b in cross section is uncircularized can be changed in the longitudinal direction of the optical fiber 1 by the foregoing twist. Since the foregoing twist is applied so as to be inverted alternately, the direction of the major axis of the ellipse is inverted alternately in the above described example. Also with such a structure, the outer peripheral shape of the external covering layer 3b in cross section is uncircularized, and can be changed in the longitudinal direction of the optical fiber 1.

Alternatively, also by the same apparatus as the manufacturing apparatus shown in FIG. 14, the outer peripheral shape of the covering layer 3 (the internal covering layer 3a or the external covering layer 3b) in cross section is uncircularized, and can be changed in the longitudinal direction of the optical fiber 1. In this manufacturing apparatus, the ultraviolet-curing resin for forming the internal covering layer 3a and the ultraviolet-curing resin for forming the external covering layer 3b are coated on to the glass fiber 10a within the coating device 12a at about the same time. The coating device 12a can coat a plurality of layers simultaneously. Thereafter, in the ultraviolet radiation furnace 13a, the ultraviolet-curing resin forming the internal covering layer 3a and the ultraviolet-curing resin forming the external covering layer 3b are cured at about the same time.

Also in this manufacturing apparatus, the ejection port of the die in the coating device 12a for coating the resin, which forms the external covering layer 3b, is uncircularized. Moreover, there is no mechanism in the coating device 12a, which rotates the die for coating the resin for forming the external covering layer 3b, and the roller 20 swinging is arranged instead of this mechanism. Accompanied with the roller 20, the driving device 21 for swinging the roller 20 is also arranged.

The roller 20 is positioned between the ultraviolet radiation furnace 13a and the reel 16, and the drawn optical fiber 1 contacts with the periphery plane of the roller 20. Herein, when the roller 20 is swung, the optical fiber 1 which contacts with the roller 20 moves while rolling on the periphery plane of the roller 20. A twist is applied to the optical fiber 1. The twist applied to the optical fiber 1 is propagated also to the upstream of the drawn optical fiber 1, and reaches to a portion of the ultraviolet-curing resin forming the external covering layer 3b, which is coated by the coating device 12a.

Therefore, since the ejection port of the die, which coats the resin for forming the external covering layer 3b, is uncircularized in the coating device 12a, the outer peripheral shape of the external covering layer 3b in cross section is uncircularized. The state where the outer peripheral shape of the external covering layer 3b in cross section is uncircularized can be changed in the longitudinal direction of the optical fiber 1 by the foregoing twist. Since the foregoing twist is applied so as to be inverted alternately, the state where the outer peripheral shape of the external covering layer 3b in cross section is uncircularized is also inverted alternately in the above described example. Also with such a structure, the outer peripheral shape of the external covering layer 3b in cross section is uncircularized, and can be changed in the longitudinal direction of the optical fiber 1.

When the outer peripheral shapes of the internal and external covering layers 3a and 3b in cross section are made to be elliptical, the direction of the major axis in cross section of the ejection port in the first coating device 12 and the direction of the major axis in cross section of the ejection port in the second coating device 14 are not made to be coincident with each other, and a predetermined angle between them should be provided. Moreover, when the state of the uncircular is changed in the longitudinal direction of the optical fiber, the ejection port shape of the die may be deformed in the case where the shape in cross section of the covering layer 3 (the external shape of the internal and external covering layers 3a and 3b) is changed in the longitudinal direction.

INDUSTRIAL APPLICABILITY

The present invention provides an optical fiber which can be suitably used for WDM transmissions and the like, and a method of manufacturing the same.

The invention claimed is:

1. An optical fiber comprising: a glass portion including a core and a cladding; and one or more covering layers formed around the glass portion,
   wherein the relative positional relationship between the glass portion and the covering layer in cross section perpendicular to the longitudinal direction of the optical fiber is continuously changed in a longitudinal direction of the optical fiber when the covering layer is formed,
   wherein a center of said glass portion and a center of the covering layer are decentered from each other in cross section perpendicular to the longitudinal direction of the optical fiber, and a decenter direction in cross section is changed along the longitudinal direction of the optical fiber, and wherein the covering layer is formed to be a two-layered structure composed of an internal covering layer and an external covering layer, and at least one of centers of the internal and external covering layers is decentered from the center of the glass portion.

2. The optical fiber according to claim 1, wherein a decenter amount, which is a distance between the center of the glass portion and the center of the covering layer, is 12.5 µm or more.

3. An optical fiber comprising: a glass portion including a core and a cladding; and one or more covering layers formed around the glass portion, wherein:
the relative positional relationship between the glass portion and the covering layer in cross section perpendicular to the longitudinal direction of the optical fiber is continuously changed in a longitudinal direction of the optical fiber when the covering layer is formed;
the covering layer has a non-circular cross sectional shape with a major axis perpendicular to the longitudinal direction of the optical fiber; and
a direction of the major axis is changed in the longitudinal direction of the optical fiber when said covering layer is formed.

4. The optical fiber according to claim 3, wherein the covering layer is formed to be a two-layered structure composed of an internal covering layer and an external covering layer, an outer peripheral shape in cross section, which is a boundary surface between the internal and external covering layers, is uncircularized, and an arrangement of the uncircularized boundary shape is changed in the longitudinal direction of the optical fiber.

5. The optical fiber according to claim 3, wherein a difference between the maximum diameter of an inscribed circle and the minimum diameter of a circumscribed circle in the covering layer is set to 5.0 µm or more.

6. The optical fiber according to claim 1 or 3, wherein the relative positional relationship of the covering layer is changed with a periodicity in the longitudinal direction of the optical fiber.

7. The optical fiber according to claim 6, wherein the periodicity is 0.5 m or less.

8. The optical fiber according to claim 7, wherein the periodicity is 0.2 m or less.

9. The optical fiber according to claim 6, wherein the periodicity of the relative positional relationship of the covering layer is changed in the longitudinal direction.

* * * * *